United States Patent [19]

Hoehn

[11] Patent Number: 4,932,476
[45] Date of Patent: Jun. 12, 1990

[54] LEVELING POSITION INDICATOR

[75] Inventor: Kevin W. Hoehn, Johnston, Iowa

[73] Assignee: Deere & Company, Moline, Ill.

[21] Appl. No.: 401,685

[22] Filed: Sep. 1, 1989

[51] Int. Cl.⁵ .................... A01B 63/14; A01B 71/02
[52] U.S. Cl. ................... 172/430; 172/328;
74/DIG. 7; 116/281; 116/283
[58] Field of Search .............. 172/315, 316, 328, 413,
172/427, 430, 504; 116/278, 262, 281, 282, 283,
285, DIG. 13; 74/DIG. 7; 40/488, 490

[56] References Cited

U.S. PATENT DOCUMENTS

| 685,164 | 10/1901 | Morris | 116/281 |
|---|---|---|---|
| 2,373,486 | 4/1945 | Love | 116/282 X |
| 2,589,896 | 3/1952 | Toland | 172/430 X |
| 2,704,047 | 3/1955 | Lushenko | 116/285 |
| 3,077,179 | 2/1963 | Evanson | 116/285 |
| 3,912,017 | 10/1975 | Rehn | 172/328 |
| 3,917,004 | 11/1975 | Finley | 172/328 |
| 4,198,921 | 4/1980 | Horton | 116/283 |
| 4,379,491 | 4/1983 | Riewerts et al. | 172/328 |
| 4,809,786 | 3/1989 | Hoehn et al. | 172/328 X |

FOREIGN PATENT DOCUMENTS

| 558460 | 6/1958 | Canada | 116/281 |
|---|---|---|---|
| 1226632 | 3/1971 | United Kingdom | 116/283 |

OTHER PUBLICATIONS

John Deere 330 Round Baler Operator's Manual (OM--E75043), pp. 35-5, 55-7 and 55-8 (Jul. 1985).
John Deere 335 and 375 Round Baler Parts Catalog (PC-2274), pp. 40-41, 71"72 (17 Jan. 1989).
John Deere 2810 Moldboard Plow Operator's Manual, p. 25-2 (6-89).

Primary Examiner—Randolph A. Reese
Assistant Examiner—Jeffrey L. Thompson

[57] ABSTRACT

A level indicator for a disk harrow or the like having a motorized on-the-go leveling adjustment. A small diameter flexible cable is attached to the spring retainer which bears against one end of the coil spring on an adjustable link structure located between pivoting hitch structure and the adjustable ground wheels. The opposite end of the cable is attached to a slide which is free to move vertically in a bracket fixed to the motor mounting bracket. The weight of the slide maintains tension on the cable and as the motor is activated to move the spring retainer relative to the motor mounting bracket, the cable moves the slide vertically to provide an indication of the leveling adjustment. The consistent relationship between the spring retainer and the motor bracket at a given adjustment position provides an easy to read indication even though the entire leveling system may be moving relative to the machine frame.

6 Claims, 3 Drawing Sheets 4,932,476

LEVELING POSITION INDICATOR

BACKGROUND OF THE INVENTION

(1) Field of the Invention

The present invention relates generally to agricultural implements such as disks, and, more specifically, to leveling systems providing on-the-go adjustments.

(2) Related Art

U.S. Pat. No. 4,809,786, of common ownership with the present application, shows and describes a mechanism for providing on-the-go disk harrow leveling adjustment from the cab of the towing vehicle. Rotatable screw structure having an effective length which determines the relative height and vertical force of the front and rear disk gangs includes a hydraulic motor remotely operable from the tractor cab to provide the desired disk leveling for given operating and field conditions. Although a mark or other flag device has been utilized to detect screw shaft rotation from the cab, the operator often cannot determine the position of the screw structure within its adjustment range and as a result can actually stall the motor at the range limits before he realizes that the limits are near. This inability to determine position from the cab results in additional wear and loading on the screw structure.

Providing an accurate and consistent indication on a disk leveling system involves overcoming the problem of movement of the entire leveling system relative to the machine frame during operation. A typical leveling system includes a coil spring, the compression of which not only varies with leveling adjustments but also with changing field and operating conditions.

BRIEF SUMMARY OF THE INVENTION

It is therefore an object of the invention to provide a level indicator for a remotely operable leveling system on a disk harrow or similar device. It is a further object to provide such an indicator which overcomes the aforementioned problems.

It is a further object to provide a level indicator for a remotely operable leveling system on an implement which is simple and uncomplicated in design and yet which allows an operator to quickly and easily determine adjusted position.

It is another object of the present invention to provide an improved level indicating arrangement for a disk harrow or similar implement to let an operator know at a glance from the towing vehicle cab the status and position of the leveling system. It is a further object to provide such an arrangement which gives an easy to read and consistent indication of leveling adjustment, even with changing field and operating conditions. It is still another object to provide such an arrangement which is particularly useful with leveling systems that utilize a coil spring.

A level indicator constructed in accordance with the teachings of the present invention includes a small diameter flexible cable attached to the spring retainer which bears against one end of the coil spring on an adjustable link structure located between pivoting hitch structure and the adjustable ground wheels on a disk harrow. The opposite end of the cable is attached to a slide which is free to move vertically in a bracket fixed to the motor mounting bracket. The weight of the slide maintains tension on the cable and as the adjustment screw is rotated to move the spring retainer relative to the motor mounting bracket, the cable moves the slide vertically to provide an indication of the leveling adjustment. The consistent relationship between the spring retainer and the motor bracket at a given screw adjustment position provides an easy to read indication even though the entire leveling system may be moving relative to the machine frame.

The indicator allows the operator to quickly and easily determine the adjustment position of the leveling mechanism from the cab and to quickly and easily determine the direction and amount of adjustment from that position. The operator is able to determine approaching adjustment limits before the motor stalls. Therefore, compared to the previous system, there is less wear and load on the adjusting system so that the lifetime of the system is increased. The design is very simple for added reliability and durability.

These and other objects, features, and advantages of the present invention will become apparent to one skilled in the art upon reading the following detailed description in view of the drawings.

DESCRIPTION OF THE PREFERRED EMBODIMENT

(1) The Disk Leveling System

Figure 1:
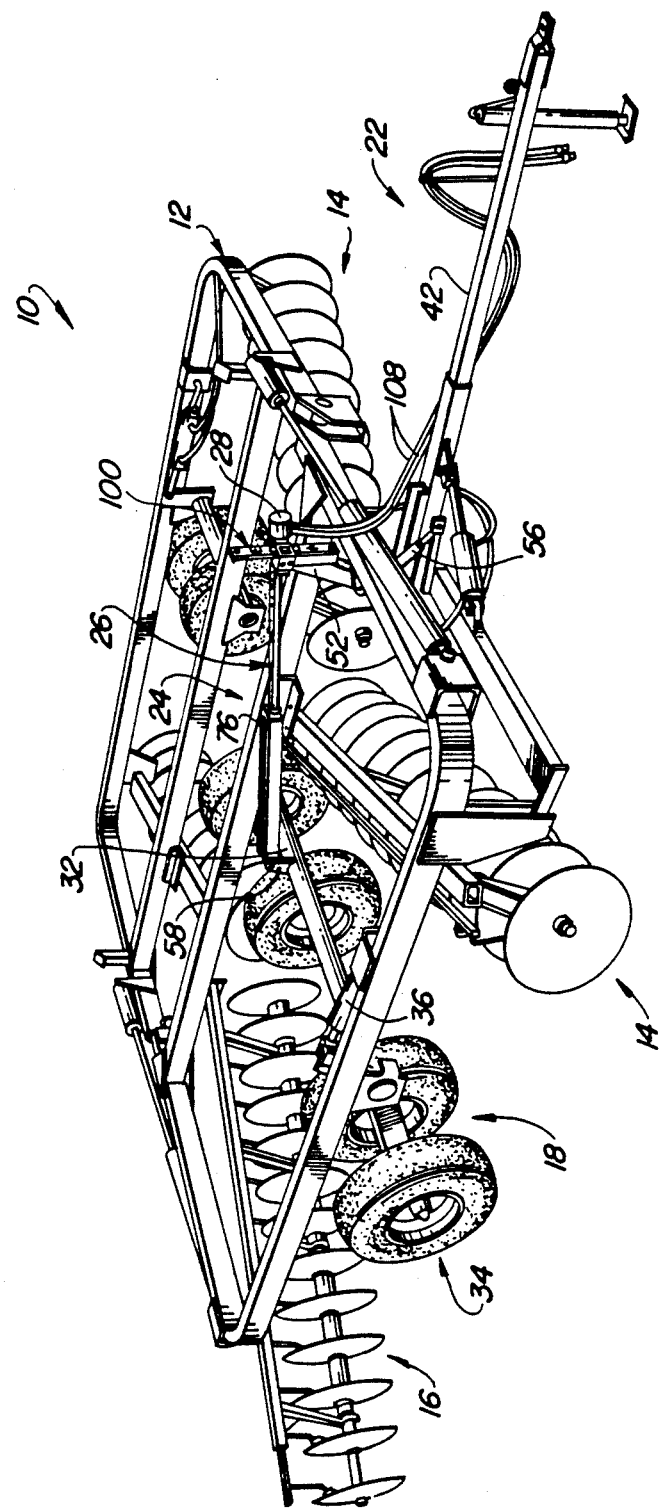
FIG. 1 is a perspective view of an implement having a leveling system including a level indicator constructed in accordance with the teachings of the present invention.

Referring now to FIG. 1, therein is shown a disk harrow 10 having a main frame 12 supporting front and rear angled disk gangs 14 and !6, respectively. Vertically adjustable ground wheel structure 18 is connected to the frame 12 for moving the frame between a lowered field-working position and a raised transport position. Hitch structure 22 is pivotally connected to the forward portion of the frame 12 for rocking about a generally horizontal transverse axis. Adjustable link structure indicated generally at 24 is connected between the pivoting hitch structure 22 and the ground wheel structure 18 to automatically maintain the frame 12 in a preselected level condition as the ground wheel structure 18 is adjusted vertically. The link structure 24 includes an adjustable link member 26 having an effective length which is variable to determine spring compression and the relative force and height of the front and rear disk gangs 14 and 16. As will be described in detail below, the adjustable link member 26 includes rotatable screw structure which is connected to a rotating hydraulic motor 28 so that leveling adjustments can be made as necessary from the operator station on the towing vehicle connected to the hitch structure 22.

The disk harrow 10 as shown in FlG. 1 is generally of the type exemplified by the commercially available John Deere Model 235 Disk, and described in the aforementioned U.S. Pat. No. 4,809,786. The ground wheel structure 18 includes a transversely extending rockshaft 32 pivotally connected to the frame 12 and supporting a pair of transversely spaced ground wheel assemblies 34. A hydraulic cylinder 36 is operably connected between the frame 12 and the rockshaft 32 to raise and lower the wheel assemblies 34 to thereby move the frame between field-working and transport positions and to adjust working depth when the frame is in the field-working position.

The forward hitch structure 22 includes a main fore-and-aft extending hitch beam 42 having diverging rearward ends 44 pivotally connected for rocking about an axis 45 to pivot brackets 46 extending downwardly from the forward end of the frame 12. The adjustable link structure 24 operably connects the forward hitch structure 22 with the rockshaft 32 to pivot the main hitch beam 42 in response to vertical movement of the frame 12 relative to the ground.

The link structure 24 includes an upright arm 52 pivotally connected by a bracket 54 (FIG. 2) to the forward portion of the frame 12 for rocking about a horizontal, transverse axis. A link 56 is pivotally connected between the lower end of the upright arm 52 and the hitch beam 42 at a location forwardly of the pivotal axis 45 of the hitch beam 42. The adjustable link member 26 is connected at its forward end to the upper end of the upright arm 52. The aft end of the link member 26 is connected to an upwardly projecting rockshaft bracket 58. Therefore, as the rockshaft 32 is pivoted to raise the frame 12, the member 26 will move the upper end of the upright arm 52 rearwardly about the pivotal connection of the arm to the frame to thereby move the link 56 forwardly and pivot the hitch beam 42 downwardly about the pivotal axis of the beam with the frame 12. Upon lowering of the frame 12, the opposite action takes place causing the main hitch beam 42 to pivot upwardly about its pivotal connection with the frame 12. This action maintains a relatively constant preselected level condition of the frame 12 during vertical adjustment and movement between the transport and field-working positions of the implement.

By adjusting the link member 26, the preselected level condition may be changed depending on field and operating conditions to assure good disking action which does not leave center ridge or valleys in the disked field. Preferably, the link 56 is a turnbuckle which can be adjusted to provide proper leveling when the upright arm 52 is stopped against the frame 12 in its transport position. Further explanation of the force transferring and leveling action may be had by referring to U.S. Pat. No. 3,912,017 (Rehn).

Figure 2:
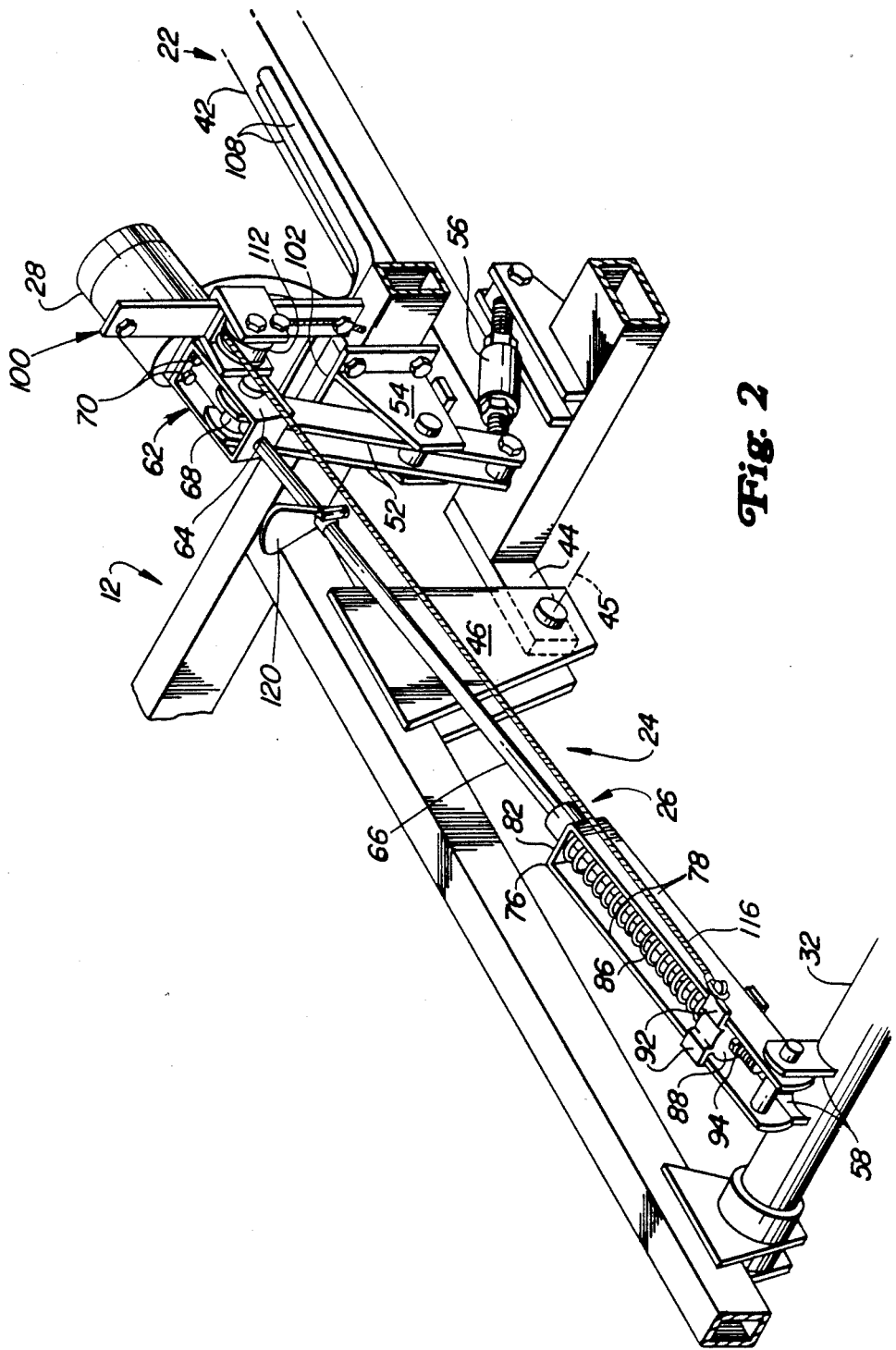
FIG. 2 is an enlarged perspective view of the adjustable link structure on the leveling system of FIG. I, showing the level indicator structure.
Figure 3:
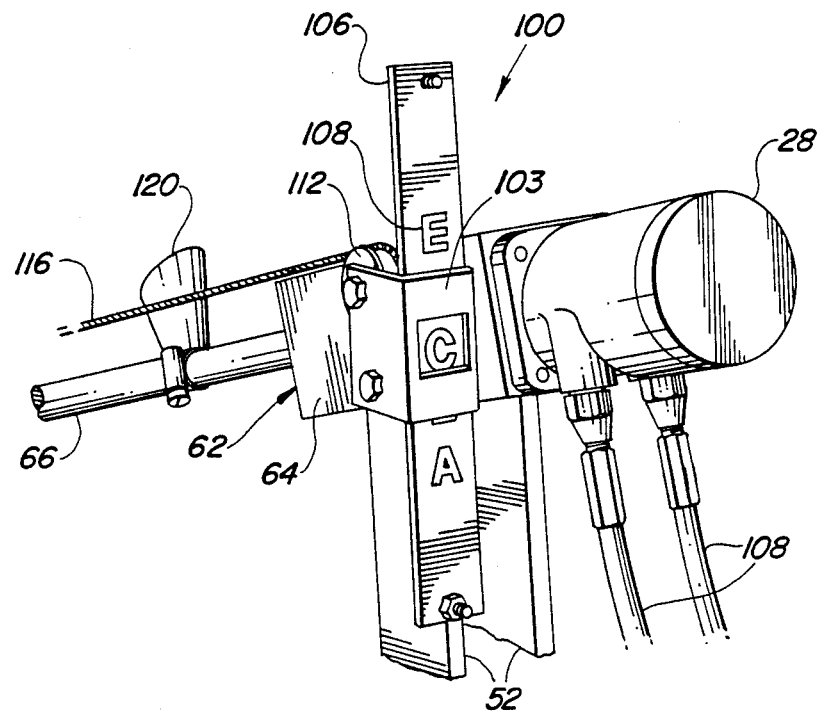
FIG. 3 is a front view of the indicator structure of FIG. 2.

As best seen in FIG. 2, the arm 52 includes a pair of spaced, parallel plates. An open boxlike bracket 62 includes fore-and-aft extending sidewalls 64 pivotally connected to the respective plates of the arm 52 such that the space between the plates at the upper end of the arm remains open. The rotary hydraulic motor 28 is connected to the front wall of the bracket 62, and a threaded rod 66 is operably connected to the motor 28 and extends through a trunnion 68 pivotally connected to the arm 52 and the bracket 62. The rod extends through and is also supported within an aperture in the front wall of the boxlike bracket 62. The motor includes a plurality of internally threaded apertures, and a like plurality of bolts 70 extend through bushings loosely contained in the front wall of the bracket 62 and are threaded into the apertures to permit the motor to "float" during operation to eliminate binding.

A yoke 76 includes rearwardly directed side legs 78 connected at their aft ends to the rockshaft bracket 58. Bight portion 82 (FIG. 2) of the yoke 76 includes a hole for receiving the threaded end of the rod 66. The rod 66 extends through the bight portion 82, and a helical compression spring 86 is received over the end of the rod projecting through the bight portion 82. A rear spring retainer or abutment member 88, positioned on the threaded end of the rod 66, compresses the spring 86 to bias the rod rearwardly through the bight portion. The member 88 is internally threaded to receive the threaded end of the rod 66. The retainer member 88 is slidably received between the side legs 78 of the yoke 76 and is held against rotation with respect to the side legs by tabs 92. A lock nut 94 is threaded onto the aft end of the threaded rod 66 to prevent rotation of the rod out from the internally threaded retainer member 88. A preload is provided in the compression spring 86 when the harrow is raised to its transport position so that it will hold the upright arm 52 rearwardly against a stop 102 supported by the bracket 54 when the disk harrow is in its transport position. The preload is relatively large to maintain a substantially rigid hitch-to-frame connection during transport. Also during transport the spring acts as a shock absorber to cushion dynamic loads imposed on the implement. The spring 86 permits limited rocking of the hitch during field-working operations so that the entire link structure 24 may be in motion relative to the frame 12.

(2) Operation of the Disk Leveling System

In the field-working position, the threaded rod 66 may be rotated by activating the hydraulic motor 28 from the cab of the towing vehicle. The hydraulic motor 28 is connected by a pair of hydraulic lines 108 to a conventional operator control located in the tractor cab An orifice (not shown) is provided in the fluid circuit to limit the speed of rotation of the motor 28. If during operating the front gangs 14 appear to be operating too deeply relative to the rear gangs 16, the operator activates the hydraulic motor 28 to thread the rod 66 farther into the internally threaded retainer member 88 to thereby decrease the effective length of the link member 26. Decreasing the effective length compresses the spring 86 and rotates the upright arm 52 rearwardly to force the forward portion of the hitch beam 42 downwardly, raising the forward end of the frame 12 and transferring more force to the rear gangs 16. If the rear disk gangs 16 are too deep compared to the front gangs 14, the hydraulic motor is operated in the opposite direction to increase the effective length of the link member 26 which raises the forward end of the hitch beam 42 and the aft end of the frame 12 relative to the forward end of the frame to thereby increase the force on the front gangs 14. Leveling and force transfer adjustments can be made on the go without need for the operator to leave the tractor cab. Screw thread pitch is selected such that once the proper leveling adjustment is made, the rod 66 and retainer member 88 maintain the desired effective length of the link member 26 independently of the rotary hydraulic motor 28.

(3) The Leveling Indicator

To allow the operator to quickly and easily determine the length adjustment of the link member 26, even when the link structure is constantly moving relative to the frame 12, leveling indicator structure 100 is connected between the hitch structure 22 and the ground wheel structure 18 and is responsive to changes in the effective length of the link member 26. A windowed bracket 103 is fixed to the motor bracket 64 and receives a slide 106 which is free to move vertically within the bracket. A decal 108 with a lettered scale is attached to the slide 106 so that different letters are visible through the window as the slide moves vertically. The bracket 103 also supports a pulley 112 located rearwardly of the slide 106 near the top of the bracket 103.

A flexible link or cable 116 is attached at one of its ends to one of the tabs 92 on the rear spring retainer member 88. The cable 116 is routed forwardly to the bracket 103, over the pulley 112, and downwardly to a connection with the lower end of the slide 106. The weight of the slide 106 maintains tension on the cable 116. As the adjustment rod 66 is rotated to change the leveling adjustment in the manner described above, the spring retainer member 88 is moved relative to the motor bracket 62 and the slide 106 moves vertically. As can be appreciated from FIG. 2, the distance between the tab 92 on the retainer member 88 and the motor bracket 62 remains constant at a given link adjustment even with changes in compression of the coil spring 86 with the attendant changes in position of the leveling system relative to the frame 12 so that a consistent and easy to read leveling indication is provided by the lettered slide 106. A flag 120 is provided on the rod 66 so the operator can determine the direction of rotation of the motor. By viewing the number in the bracket window, the operator can at a glance determine the link adjustment and avoid stalling the motor 28 at the adjustment limits of the link. Unnecessary motor use is also avoided.

Having described the preferred embodiment, it will be apparent that modifications can be made without departing from the scope of the invention as defined in the accompanying claims.

I claim:

1. In an implement having a frame supporting front and rear earthworking tools, hitch structure, vertically adjustable ground wheel structure and an adjustable length member connected between the hitch structure and the ground wheel structure with means for changing the length of the member on-the-go to thereby change the relative height of the front and rear tools, level indicating structure for providing an indication of the height of the front and rear tools relative to each other, comprising:

a first bracket connected to one of the implement structures;
    a link connected to the adjustable length member;
    a movable indicator supported by the first bracket;
    means operably connecting the link to the indicator for moving the indicator in response to changes in length of the adjustable member; and
    wherein the adjustable length member comprises a rotatable screw received by an internally threaded member including means for rotating the threaded member and screw relative to each other, and wherein the link is connected to the threaded member.

2. The invention as set forth in claim 1 wherein the adjustable length member includes a yieldable spring-biased portion, and means for connecting the link to the adjustable length member to provide a constant preselected indication for a given member length adjustment regardless of the amount of yielding of the spring-biased portion.

3. The invention as set forth in claim 2 wherein the spring-biased portion includes a spring keeper, a spring-retaining bracket, and a coil spring adjustably compressed between the spring keeper and the spring-retaining bracket and yieldingly biasing the spring-retaining bracket to a preselected position; and wherein the link comprises flexible cable structure and the means for connecting the link includes means for connecting the cable to the spring keeper.

4. In an implement having a frame supporting front and rear earthworking tools, a hitch pivotally connected to the frame and an adjustable force transferring mechanism connected to the hitch for changing the angle of the hitch relative to the hitch frame to change the relative forces acting downwardly on the front and the rear tools, wherein the adjustable force transferring mechanism includes a rotatable member having a screw received by a threaded member, means for adjusting the force transferring mechanism on-the-go including means for rotating the threaded member and screw relative to each other, and indicating structure for providing an indication of the force transferring adjustment for viewing from a location remote from the implement, said indicating structure comprising:

a bracket supported by the implement frame and receiving a sliding indicator therein;
    a link connected to the force transferring mechanism for movement in response to relative rotation between the screw and the threaded member; and
    means operably connecting the link to the indicator for sliding the indicator within the bracket in response to relative rotation between the screw and the threaded member.

5. The invention as set forth in claim 4 wherein the force transferring mechanism includes a yieldable member for permitting limited rocking of the hitch relative to the frame without changing the locations of the rotatable screw relative to the threaded member, and including means for connecting the link to the rotatable member to provide a constant force transferring indication for a given location of the screw relative to the threaded member regardless of the rocking of the hitch.

6. The invention as set forth in claim 4 wherein the link comprises a flexible cable, and the sliding indicator comprises an upright slide biased downwardly in the bracket under the influence of its own weight, and the means for connecting the link to the indicator causes the slide to maintain tension on the flexible cable.

* * * * *